United States Patent
Lee et al.

(10) Patent No.: US 9,676,903 B2
(45) Date of Patent: Jun. 13, 2017

(54) POLYESTER RESIN AND METHOD FOR PREPARING THE SAME

(71) Applicant: SK Chemicals Co., Ltd., Gyeonggi-Do (KR)

(72) Inventors: Roy Lee, Seoul (KR); Jong-Ryang Kim, Gyeonggi-do (KR); Jae-Bong Lim, Gyeonggi-do (KR); Won-Jae Yoon, Seoul (KR); Dong-Jin Kim, Seoul (KR); Kyu-Tae Park, Seoul (KR); Yoo-Jin Lee, Seoul (KR)

(73) Assignee: SK CHEMICALS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/099,106

(22) Filed: Apr. 14, 2016

(65) Prior Publication Data

US 2016/0222157 A1    Aug. 4, 2016

Related U.S. Application Data

(62) Division of application No. 13/394,805, filed as application No. PCT/KR2010/006229 on Sep. 13, 2010, now abandoned.

(30) Foreign Application Priority Data

Sep. 14, 2009 (KR) ................. 10-2009-0086244

(51) Int. Cl.
*C08G 63/02* (2006.01)
*C08G 63/672* (2006.01)
*C08G 63/78* (2006.01)

(52) U.S. Cl.
CPC .......... *C08G 63/672* (2013.01); *C08G 63/78* (2013.01); *Y10T 428/1352* (2015.01)

(58) Field of Classification Search
CPC .............................. C08G 63/78; C08G 63/672
USPC ........... 428/34.1, 35.7, 36.9, 36.92; 528/176, 528/180, 271, 272, 275, 298, 300, 302, 528/307, 308, 308.68; 524/81, 779; 525/165, 176, 177, 437, 439, 440, 444
See application file for complete search history.

(56) References Cited

U.S. PATENT DOCUMENTS

| | | | |
|---|---|---|---|
| 5,958,581 A | 9/1999 | Khanarian | ........... C08G 63/672 264/176.1 |
| 5,959,066 A | 9/1999 | Charbonneau et al. | |
| 6,063,464 A | 5/2000 | Charbonneau et al. | ... 428/36.92 |
| 6,126,992 A | 10/2000 | Khanarian et al. | |
| 6,914,120 B2 * | 7/2005 | Germroth | ........... C08G 63/672 528/300 |
| 2003/0204029 A1 | 10/2003 | Brandenburg et al. | |
| 2006/0286322 A1 | 12/2006 | Crawford | ............ A01G 9/1438 428/35.7 |

* cited by examiner

*Primary Examiner* — Terressa Boykin
(74) *Attorney, Agent, or Firm* — Blakely Sokoloff Taylor & Zafman LLP

(57) ABSTRACT

A polyester resin copolymerized with isosorbide and 1,4-cyclohexane dimethanol and having an improved impact strength, and a method for preparing the same are disclosed. The copolymerized polyester resin has an alternating structure of acid moieties which are derived from acid components and diol moieties which are derived from diol components, wherein the acid components comprise terephthalic acid, and the diol components comprise (i) 5~99 mol % of 1,4-cyclohexanedimethanol and (ii) 1~60 mol % of isosorbide with respect to the total diol components.

2 Claims, No Drawings

POLYESTER RESIN AND METHOD FOR PREPARING THE SAME

TECHNICAL FIELD

This invention relates to a polyester resin and a method for preparing the same, and more specifically to a polyester resin copolymerized with isosorbide and 1,4-cyclohexane dimethanol and having an improved impact strength, and a method for preparing the same.

BACKGROUND ART

The polyester resin has been widely used in fields of the packing materials, the forming products and the films, and is one of the environment-friendly plastics which has no endocrine disruptors. Recently, in the polycarbonate which has been used as the heat-resisting container for food, harmfulness of bisphenol-A to the human being has been revealed. So, the demand for the environment-friendly transparent and heat-resisting polyester resin has more increased. The polyerster resin which is copolymerized with at least two glycol or dicarboxylic acid components has been commercially widely used to improve a moldability thereof and to remove a crystallinity thereof. In the case of homopolyester which is polymerized with only terephthalic acid and ethyleneglycol, material properties and heat-resistance thereof can be enhanced through a stretching-induced crystallization and heat-setting. However, there are lim-itations on application and enhancement of heat-resistance. In the case of polyester which is copolymerized with at least two glycol or terephthalic acid components, there is a disadvantage that it is difficult to enhance heat-resistance thereof by stretching or crystallize process. As another method to enhance heat-resistance of the polyester, it is known that the isosorbide which is an environment-friendly diol compound derived from starch and represented by following Formula 1, is used as one of monomers.

[Formula 1]

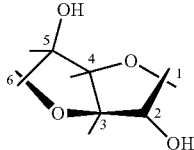

According to the results of past studies, isosorbide has low activity as a secondary alcohol so that it is difficult to prepare high viscous polyester which can be used for manufacturing sheets or bottles. However, recent U.S. Pat. No. 5,959,066 discloses a method for preparing polyester having the intrinsic viscosity of more than 0.35 dl/g by melt polymerization using terephthalic acid or dimethylterephthalate and various diols comprising isosorbide. The polyester resin having the intrinsic viscosity of more than 0.35 dl/g is used for optical products and coating, and the polyester resin having the intrinsic viscosity of more than 0.4 dl/g is used for CD, and the polyester resin having the intrinsic viscosity of more than 0.5 dl/g can be used for a bottle, a film, a sheet and injection molding. Moreover, U.S. Pat. No. 6,063,464 discloses a method for preparing the polyester having the intrinsic viscosity of more than 0.15 dl/g by melt polymerization using the glycol components comprising isosorbide. The above patents disclose a method for polymerizing polyester using common catalysts with all of acids and diols comprising isosorbide, however, it seems that a composition for higher impact strength is needed to be used for normal plastics. As shown in Examples of U.S. Pat. No. 6,063,464, notch izod impact strength of products produced by adding glass fiber of 29.6% to polyesters comprising isosorbide of 3, 6, and 13%, shows the range of 43-116 J/m according to the amount of isosorbide, however, impact strength of a product without glass fiber is not mentioned. If glass fiber is added, usually impact strength is enhanced, but transparency is extremely lowered and applications are limited due to the harmfulness of glass fiber.

DISCLOSURE OF INVENTION

Technical Problem

Therefore, it is an object of the present invention to provide a copolymerized polyester resin having superior heat-resistance and impact strength and the method for preparing the same.

It is other object of the present invention to provide a copolymerized polyester resin having a high molecular weight by using 1,4-cyclohexanedimethanol and isosorbide as diol components and the method for preparing the same.

Solution to Problem

To accomplish these objects, the present invention provides a copolymerized polyester resin having an alternating structure of acid moieties which are derived from acid components and diol moieties which are derived from diol components, wherein the acid components comprise terephthalic acid, and the diol components comprise (i) 5-99 mol % of 1,4-cyclohexanedimethanol and (ii) 1-60 mol % of isosorbide with respect to the total diol components.

The present invention also provides a method for preparing polyester resin, comprising the steps of: carrying out an esterification reaction or a trans-esterification reaction of acid components and diol components at the increased pressure of 0.2-3.0 kg/cm² and the temperature of 200-300° C. during an average retention time of 2-10 hours; and caffying out a polycondensation reaction for a product of the esterification reaction or the trans-esterification reaction at the reduced pressure of 400-0.1 mmHg and at the temperature of 240-300° C. during an average retention time of 1-10 hours, wherein the acid components comprise terephthalic acid, and the diol components comprise (i) 5-99 mol % of 1,4-cyclohexanedimethanol and (ii) 1-60 mol % of isosorbide with respect to the total diol components. The polyester resin of the present invention shows superior heat-resistance and impact strength by using 1,4-cyclohexanedimethanol and isosorbide as diol components.

Advantageous Effects of Invention

The polyester resin according to the present invention has superior heat-resistance and impact strength because it use 1,4-cyclohexane dimethanol and isosorbide at the same time as diol components.

BEST MODE FOR CARRYING OUT THE INVENTION

A more complete appreciation of the invention, and many of the attendant advantages thereof, will be better appreciated by reference to the following detailed description.

The copolymerized polyester resin according to the present invention is prepared by copolymerization of acid components and diol components, and has an alternating structure of acid moieties which are derived from the acid components and diol moieties which are derived from the diol components.

The acid components include terephthalic acid as a major component. Specifically, the acid components can be composed entirely of terephthalic acid, or, if necessary, may include a minor amount of one or more copolymerization acid components (copolymerization monomers) which are selected from the group consisting of aromatic dicarboxylic acid components of 8-14 carbon numbers, aliphatic dicarboxylic acid components of 4-12 carbon numbers and mixtures thereof for improving the properties of the produced polyester resin. The preferable amount of the terephthalic acid component is 80-100 mol % with respect to the total acid components. The preferable amount of the copolymerization acid components is 0-50 mol %, more preferably 0.1-40 mol %, most preferably 1-10 mol %, and, generally 0-20 mol % with respect to the total acid components. If the amount of the copolymerization acid components is beyond the range, the properties of the polyester resin may be insufficiently improved or even deteriorated. The aromatic dicarboxylic acid components of 8-14 carbon numbers include various aromatic dicarboxylic acid components which are conventionally used for producing polyester resin, and examples thereof include benzenedicarboxylic acid such as phthalic acid and isophthalic acid, naphthalene dicarboxylic acid such as 2,6-naphthalene dicarboxylic acid, diphenyl dicarboxylic acid, and so on, except terephthalic acid. The aliphatic dicarboxylic acid components of 4-12 carbon numbers include various linear, branched or cyclic aliphatic dicarboxylic acid components which are conventionally used for producing polyester resin, and examples thereof include cyclohexane dicarboxylic acid such as 1,4-cyclohexane dicarboxylic acid and 1,3-cyclohexane dicarboxylic acid, sebasic acid, succinic acid, isodecylsuccinic acid, maleic acid, fumaric acid, adipic acid, glutaric acid, azelaic acid, and so on. In the present invention, one or more of the copolymerization acid components can be used at the same time. In this specification, the term "terephthalic acid or terephthalic acid component" include terephthalic acid, alkyl ester (lower alkyl (1-4 carbon numbers) ester such as monoalkyl, monoethyl, dimethyl, diethyl or dibutyl ester) of terephthalic acid, and acid anhydride thereof, which produce terephthaloyl moiety when reacted with glycol component. Also, in this specification, the acid moiety or the diol moiety represents residue which remains after hydrogens, hydroxyl groups, or alkoxy groups are removed in the polymerization reaction of the acid components and the diol components.

The diol components of the present invention include (i) 5-99 mol %, preferably 5-95 mol %, more preferably 8-91 mol %, most preferably 20-91 mol % of 1,4-cyclohexane dimethanol (CHDM mol %) and (ii) 1-60 mol %, preferably mol % range of the following Equation 1 and equal or less than 60 mol %, more preferably 4-40 mol %, most preferably 8-40 mol % of isosorbide (ISB mol %) with respect to the total diol components.

0.0012(CHDM mol %)$^2$−0.2401(CHDM mol %)+14.136<=ISB mol %<=0.0049(CHDM mol %)$^2$−0.2255(CHDM mol %)+71.176     [Equation 1]

The remaining components in the total diol components can be selected from the group consisting of (iii) ethylene glycol, (iv) other copolymerization diol components (monomers) for improving the properties of the polyester resin such as diethylene glycol, triethylene glycol, propanediol (for example, 1,2-propanediol and 1,3-propanediol), 1,4-butanediol, pentanediol, hexanediol (for example, 1,6-hexanediol), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, tetramethylcyclobutanediol, and mixtures thereof. When other diol components which are not (i) 1,4-cyclohexanedimethanol and (ii) isosorbide are used, the major component of the other diol components is preferably (iii) ethylene glycol. Namely, the remaining diol components except (i) 1,4-cyclohexanedimethanol and (ii) isosorbide are preferably composed of (iii) ethylene glycol. If (iv) the other copolymerization diol components for improving the properties of the polyester resin are used, the amount of (iv) the other copolymerization diol components is preferably 0-50 mol %, more preferably 0.1-40 mol %, and generally 1-10 mol % with respect to the total diol components. In the ranges of (i) 1,4-cyclohexanedimethanol and (ii) isosorbide (1,4:3,6-dianhydroglucitol) of the present invention, as the amount of 1,4-cyclohexanedimethanol increases, the impact strength of the produced polyester resin rapidly increases. Therefore, in the present invention, (i) 1,4-cyclohexanedimethanol and (ii) isosorbide improve the properties such as an impact strength, a moldability of the produced polyester resin compared with a homopolymer prepared with only terephthalic acid and ethylene glycol. When the amount of 1,4-cyclohexanedimethanol is less than 5 mol %, the impact strength of the polyester resin may be undesirable. When the amount of 1,4-cyclohexane dimethanol is more than 99 mol %, the amount of isosorbide is less than 1 mol % and the heat-resistance of the polyester resin may decrease. Meanwhile, when the amount of isosorbide is less than 1 mol %, the heat-resistance of the polyester resin may be insufficient, and when the amount of isosorbide is more than 60 mol %, the color of the polyester resin may become yellow.

When the polyester resin of the present invention is molded into a test sample of thickness of 3.2 mm, the notch izod impact strength (ASTM D256 method, measuring temperature: 23° C.) of the test sample is generally more than 50 Jim. On the other hand, when a polyester resin is prepared with ethylene glycol and isosorbide, the test sample generally has the notch izod impact strength of less than 50 Jim. When the polyester resin of the present invention is subject to an annealing treatment at 300° C. for 5 minutes, and is cooled to room temperature, and then is re-heated with the temperature increasing speed of 10° C. 1 min, the polyester resin shows the glass transition temperature (Tg) of more than 90° C. Meanwhile, when the polyester resin of the present invention is dissolved with orthochlorophenol (OCP) to a concentration of 1.2 gldl, the polyester resin shows the intrinsic viscosity of more than 0.35 dllg, preferably more than 0.40 dllg, more preferably 0.45 dl/g at the temperature of 35° C. Since the polyester resin of the present invention has superior heat-resistance and impact strength, the polyester resin is suitable for producing polyester resin article selected from the group consisting of a film, a sheet, a drink bottle, a baby bottle, a fiber, an optical product, and so on.

Hereinafter, the method for preparing polyester resin of the present invention will be described. First, (a) the acid components and the diol components are subject to an esterification reaction or a trans-esterification reaction at the increased pressure of 0.2-3.0 kg/cm$^2$ and the temperature of 200-300° C. dming an average retention time of 2-10 hours. Preferably, the acid components include (i) 80-100 mol % of terephthalic acid component and (ii) 0-20 mol % of copolymerization acid components which are selected from the group consisting of aromatic dicarboxylic acid components of 8-14 carbon numbers, aliphatic dicarboxylic acid components of 4-12 carbon numbers and mixtures thereof. The diol components includes (i) 5-99 mol % of 1,4-cyclohexane dimethanol, (ii) 1-60 mol % of isosorbide, and optionally (iii) ethylene glycol and other copolymerization diol components. Next, (b) the product of the esterification reaction or the trans-esterification reaction is subject to a poly condensation reaction at the reduced pressure of 400-0.1 mmHg and at the temperature of 240-300° C. during an average retention time of 1-10 hours to produce the polyester resin of the present invention. Preferably, the pressure of the polycondensation reaction eventually reaches to less than 2.0 mmHg, and the esterification reaction or the trans-esterification reaction and the polycondensation reaction are calTied out under an inellgas atmosphere.

The polymerization conditions for preparing the polyester resin of the present invention will be described in more detail. For preparing the copolymerized polyester resin with terephthalic acid, isosorbide, and so on, the mole ratio of the total glycol (diol) components comprising 1,4-cyclohexanedimethanol, isosorbide, ethylene glycol and so on with respect to the total dicarboxylic acid components comprising terephthalic acid and so on is controlled to 1.05-3.0, and the esterification reaction is calTied out at the temperature of 200-300° C., preferably 240-260° C., more preferably 245-255° C. and at the increased pressure of 0.1-3.0 kg/cm$^2$, preferably 0.2-3.0 kg/cm$^2$. When the mole ratio of the total glycol components with respect to the total dicarboxylic acid components is less than 1.05, the dicarboxylic acid components may not fully react in the polymerization reaction, which deteriorates the transparency of the resin. When the mole ratio is more than 3.0, the polymerization reaction rate may decrease and the productivity of the resin may be unsatisfactory. The reaction time of the esterification reaction (average retention time) is generally 100 minutes-10 hours, preferably 2 hours-500 minutes, which can be varied according to the reaction temperature, the reaction pressure, the mole ratio of glycol components and dicarboxylic acid components, and so on. The process for preparing polyester resin can be divided into the esterification reaction (Step 1) and the polycondensation reaction (Step 2). The esterification reaction does not require catalyst, but catalyst can be used to reduce the reaction time. The esterification reaction (Step 1) can be carried out in a batch-wise manner or a continuous manner. Each reactant can be introduced into a reactor separately, but it is preferable to introduce a slurry including the glycol components and the dicarboxylic acid component into the reactor. In this case, the glycol components which are solid at room temperature (for example, isosorbide) can be dissolved with water or ethylene glycol, and then mixed with the terephthalic acid component to form a slurry. Alternatively, water can be added to a slurry including terephthalic acid component, glycol components and isosorbide to increase the solubility of isosorbide, or the slurry can be prepared at the increased temperature of more than 60° C. so that isosorbide can be melted in the slurry.

After completion of the esterification reaction (Step 1), the polycondensation reaction (Step 2) is carried out. Before the initiation of the polycondensation reaction, a polycondensation catalyst, a stabilizer, a brightening agent and other additives can be added to the product of the esterification reaction. Examples of the polycondensation catalyst include conventional titanium based catalyst, germanium based catalyst, antimony based catalyst, aluminum based catalyst, tin based catalyst, and mixtures thereof. Examples of the preferable titanium based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, titanium dioxide/silicon dioxide co-precipitates, titanium dioxide/zirconium dioxide co-precipitates, and so on. Examples of the preferable germanium based catalyst include germanium dioxide and co-precipitates of germanium dioxide. As the stabilizer for the polycondensation reaction, conventional various phosphor based stabilizers, such as phosphoric acid, trimethyl phosphate, triethyl phosphate, and so on, can be used. Preferably, the stabilizer is introduced so that the amount of phosphor of the stabilizer is 10-100 ppm with respect to the total weight of the produced polyester resin. When the amount of phosphor of the stabilizer is less 10 ppm, the polyester resin may not be sufficiently stabilized and the color of the polyester resin may become yellow. When the amount of phosphor is more than 100 ppm, the polymerization degree of the polyester resin may be insufficient. The brightening agent is added to improve the color property of the polyester resin. Examples of the brightening agent include conventional brightening agent such as cobalt acetate, cobalt propionate. If necessary, organic brightening agent can be used as the brightening agent. The preferable amount of the brightening agent is 0-100 ppm with respect to the total weight of the polyester resin. Generally, the polycondensation reaction is carried out at the temperature of 240-300° C., preferably 250-290° C., more preferably 260-280° C. and at the reduced pressure of 400-0.1 mmHg. The reduced pressure of 400-0.1 mmHg is maintained in order to remove by-products of the polycondensation reaction or excess glycol. The poly condensation reaction can be carlied out until desirable intrinsic viscosity of the polyester resin can be obtained, and, for example, can be carried out duling an average retention time of 1-10 hours.

MODE FOR THE INVENTION

Hereinafter, the following examples are provided to illustrate the present invention in more detail, but the present invention is not restricted or limited by the following examples.

In the following Examples and Comparative Examples, TPA, IPA, ISB, CHDM and EG represent a terephthalic acid, an isophthalic acid, isosorbide (1,4:3,6-dianhydroglucitol), 1,4-cyclohexanedimethanol, and ethylene glycol respectively, and the method for performance evaluation of polymers is as follows (1) Intrinsic viscosity (IV): Measure the IV of the polymer using Ubbelohde viscometer in a thermostat of 35° C., after dissolving the polymer in orthochlorophenol at 150° C. by the concentration of 0.12%

(2) Heat-resistance (Glass-rubber transition temperature (Tg)): Measure the Tg of the polyester resin during 2nd scanning with the temperature increasing speed of 10° C./min, after annealing the polyester resin at 300° C. for 5 minutes and cooling to room temperature.

(3) Impact strength: Measure the izod impact strength of the polyester resin test sample which is prepared with a thickness of 3.2 mm and notched according to ASTM D256, at 23° C. using an izod impact strength measuring instrument.

Comparative Example 1 Preparation of Polyester Resin

According to the amount described in Table 1, TPA, ISB and EG were added in the reactor of 7 L volume, and the reactor was heated to 240-300° C. And a catalyst, a stabilizer, a brightening agent and so on were added to carry out an estelification reaction and a polycondensation reaction. And the polymerization was terminated at celiain viscosity. As described in Table 1, in the finally polymelized polyester resin, the acid component was TPA only, and the glycol components were 4 mol % of ISB, 0 mol % of CHDM, 94 mol % of EG and 2 mol % of DEG, the intrinsic viscosity was 0.74 dl/g, the heat-resistance (Tg) was 85° C., and the izod impact strength according to ASTM D256 was 38 Jim.

Comparative Examples 2-5 Preparation of Polyester Resin

Except for using the amounts of TPA, IPA, ISB, and EG according to Table 1, polyester resin was prepared by the same manner described in Comparative Example 1. Intrinsic viscosity, heat-resistance (Tg) and izod impact strength of the polyester resin were measured, and represented in Table 1.

Examples 1-6 Preparation of Polyester Resin

Except for using the amounts of TPA, IPA, ISB, and EG according to Table 1, polyester resin was prepared by the same manner described in Comparative Example 1. Intrinsic viscosity, heat-resistance (Tg) and izod impact strength of the polyester resin were measured, and represented in Table 1.

TABLE 1

|  | Examples | | | | | | Comparative Examples | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| TPA (%) | 100 | 100 | 90 | 100 | 100 | 100 | 100 | 100 | 100 | 90 | 100 |
| IPA (%) |  |  | 10 |  |  |  |  |  |  | 10 |  |
| ISB (%) | 9 | 38 | 19 | 20 | 40 | 18 | 4 | 10 | 39 | 20 | 0 |
| CHDM (%) | 91 | 22 | 42 | 58 | 55 | 21 | 0 | 0 | 0 | 0 | 60 |
| EG (%) | 0 | 40 | 39 | 22 | 5 | 61 | 96 | 90 | 61 | 80 | 40 |
| IV (dl/g) | 0.66 | 0.59 | 0.63 | 0.69 | 0.55 | 0.70 | 0.74 | 0.65 | 0.58 | 0.63 | 0.75 |
| Heat-resistance (Tg, °C.) | 92 | 123 | 104 | 107 | 130 | 102 | 85 | 93 | 124 | 104 | 85 |
| Impact strength (J/m) | 90 | 68 | 129 | N.B | 302 | 91 | 38 | 37 | 30 | 32 | N.B |

In Example 4 and Comparative Example 5, impact strength could not be measured because any break did not occur (No-Break: N.B) due to high mechanical strength. As shown in Table 1, to compare a conventional polyester resin, the polyester resin according to the present invention has much superior impact strength though it has same or higher heat-resistance.

This application claims the priority benefit of Korean Patent Application No. 10-2009-0086244 filed on Sep. 14, 2009. All disclosure of the Korean Patent application is incorporated herein by reference.

What is claimed is:

1. A method for preparing polyester resin, comprising the steps of:

carrying out an esterification reaction or a trans-esterification reaction of acid components and diol components at the increased pressure of 0.2~3.0 kg/cm² and the temperature of 240~300° C. during an average retention time of 2~10 hours; and carrying out a polycondensation reaction for a product of the esterification reaction or the trans-esterification reaction at the reduced pressure of 400~0.1 mmHg and at the temperature of 240~300° C. during an average retention time of 1~10 hours, wherein the acid components comprise terephthalic acid, and the diol components comprise (i) 42~58 mol % of 1,4-cyclohexanedimethanol and (ii) 19~40 mol % of isosorbide with respect to the total diol components, and a glass transition temperature (Tg) of the polyester resin is more than 104° C., and notch izod impact strength of the polyester resin is more than 129 J/m.

2. The method for preparing polyester resin according to claim 1, wherein the amount of isosorbide (ISB mol %) is in the range of the following Equation 1, $$0.0012(CHDM\ mol\ \%)^2 - 0.2401(CHDM\ mol\ \%) + 14.136 <= ISB\ mol\ \% <= 0.0049(CHDM\ mol\ \%)^2 - 0.2255(CHDM\ mol\ \%) + 71.176$$ [Equation 1]

wherein CHDM mol % represents the amount of 1,4-cyclohexane dimethanol.

\* \* \* \* \*